United States Patent
Mittal et al.

(10) Patent No.: US 11,859,104 B2
(45) Date of Patent: Jan. 2, 2024

(54) MESOPOROUS CARBON BASED NANOCONTAINER COATINGS FOR CORROSION PROTECTION OF METAL STRUCTURES

(71) Applicant: Khalifa University of Science and Technology, Abu Dhabi (AE)

(72) Inventors: Vikas Mittal, Abu Dhabi (AE); Gisha Elizabeth Luckachan, Abu Dhabi (AE)

(73) Assignee: KHALIFA UNIVERSITY OF SCIENCE AND TECHNOLOGY, Abu Dhabi (AE)

(*) Notice: Subject to any disclaimer, the term of this patent is extended or adjusted under 35 U.S.C. 154(b) by 14 days.

(21) Appl. No.: 16/639,258

(22) PCT Filed: Aug. 17, 2017

(86) PCT No.: PCT/IB2017/054995
§ 371 (c)(1),
(2) Date: Feb. 14, 2020

(87) PCT Pub. No.: WO2019/034915
PCT Pub. Date: Feb. 21, 2019

(65) Prior Publication Data
US 2020/0248006 A1 Aug. 6, 2020

(51) Int. Cl.
C09D 5/08 (2006.01)
C09D 5/00 (2006.01)
C09D 179/02 (2006.01)
C09D 133/04 (2006.01)
C09D 129/14 (2006.01)

(52) U.S. Cl.
CPC ............ *C09D 5/086* (2013.01); *C09D 5/002* (2013.01); *C09D 129/14* (2013.01); *C09D 133/04* (2013.01); *C09D 179/02* (2013.01)

(58) Field of Classification Search
None
See application file for complete search history.

(56) References Cited

U.S. PATENT DOCUMENTS

| | | | | |
|---|---|---|---|---|
| 8,557,388 B2* | 10/2013 | Hong | ............ | C08G 18/12 428/423.1 |
| 8,968,928 B2* | 3/2015 | Wang | ............ | H01M 4/621 429/212 |
| 9,227,274 B1* | 1/2016 | Balachandra | ...... | B23K 35/0244 |
| 10,693,188 B2* | 6/2020 | Roberts | ............ | H01M 10/0525 |
| 2003/0219384 A1 | 11/2003 | Baumler et al. | | |
| 2009/0227946 A1* | 9/2009 | Kangas | ............... | A61L 29/145 522/111 |
| 2011/0236596 A1 | 9/2011 | Skorb et al. | | |
| 2013/0145957 A1 | 6/2013 | Shchukin et al. | | |

FOREIGN PATENT DOCUMENTS

| | | |
|---|---|---|
| CN | 102784598 A | 11/2012 |
| CN | 103483897 A | 1/2014 |
| CN | 105408431 A | 3/2016 |
| CN | 106810993 A | 6/2017 |
| EP | 1832629 A1 | 9/2007 |
| GR | 20110100152 | 10/2012 |
| IN | 1539/MUM/2012 | 6/2012 |
| WO | 9947253 A1 | 9/1999 |
| WO | WO 2005/123847 A1 * | 12/2005 |
| WO | 2013083293 A1 | 6/2013 |
| WO | 2014099070 | 6/2014 |

OTHER PUBLICATIONS

English abstract of WO 2018/029051 A1, Feb. 15, 2018.*
International Search Report issued in connection with PCT Application No. PCT/IB2017/054995 dated Sep. 25, 2018.
Mingzhu Liu, et al. "A facile synthesis of highly compacted, molybdenum-embedded, ordered, mesoporous, protective carbon films of graphitic structure," Corrosion Science 87 (2014) pp. 297-305.
Tao Wang, et al. "Synthesis of ordered mesoporous boron-containing carbon films and their corrosion behavior in simulated proton exchange membrane fuel cells environment," Journal of Power Sources 212 (2012), pp. 1-12.
Decision of Rejection issued by the Chinese Patent Office in connection with Application No. 201780094922.5 dated Nov. 24, 2021.

* cited by examiner

*Primary Examiner* — Tae H Yoon (74) *Attorney, Agent, or Firm* — Dennemeyer & Associates LLC; Victoria Friedman (57) ABSTRACT

A mesoporous carbon container comprising an embedded organic corrosion inhibitor and having an organic polymeric coating is described. Further described are a coating comprising such a container and a method for producing such a container.

1 Claim, 11 Drawing Sheets

(a) 1day

MESOPOROUS CARBON BASED NANOCONTAINER COATINGS FOR CORROSION PROTECTION OF METAL STRUCTURES

CROSS-REFERENCE TO RELATED APPLICATIONS

This is a 35 U.S.C. 371 National Stage Patent Application of International Application No. PCT/IB2017/054995, filed Aug. 17, 2017, which is hereby incorporated by reference in its entirety.

The present invention relates to anti-corrosion protection. In this context the present invention relates to carbon containers comprising an embedded corrosion inhibitor and having a polymeric coating, to coatings comprising such carbon containers and to methods for producing the same.

BACKGROUND

Frequent corrosion of storage and transport facilities occurs due to interaction with gas, oil, humidity, chemicals etc. and thus requires maintenance and leads to huge economic loss. In order to protect metal structures against corrosion protective polymer coatings are contemplated. Such protective polymer coatings have a barrier effect which is however interrupted when micropores or cracks are formed in or on the coating which allow the direct ingress of corrosive species into the metal surface.

What is also contemplated is a direct addition of corrosion inhibitors to a coating formulation. However, such an inhibitor often interacts chemically with other components of the coating formulation, thereby resulting in deactivation of the inhibitor and/or fast degradation of coating. Further, a constant leaching of inhibitors polluting the environment might occur, and a bulk distribution of inhibitors does not allow release of inhibitors on demand in the damaged area only.

In this context, self-healing coatings are considered a beneficial alternative as they are able to reconstruct the mechanical integrity of the polymer matrix after it has been damaged or are at least capable of stopping the development of corrosion processes at formed defects. Typically, self-healing coatings are categorized into:

i. Conductive polymer (CPs) coatings (e.g. Polyaniline, polypyrrol etc.) or Coatings having reactive functional groups (e.g. Chitosan); polymers used in the coating matrix involve in the self-healing performance.

ii. Coatings with Micro/Nanocarriers or containers of corrosion inhibitors

A coating matrix embedded with nanocontainers of corrosion inhibitors is known to perform in self-healing. If the environment of the coating changes, smart nanocontainers could quickly respond and release the healing agent onto the metal surface to stop corrosion.

PCT patent application WO2014/099070, titled "Self-healing Coatings from Recycled Polymer Blends", to Sjong et al., describes a method in which nanocontainer incorporating coatings are prepared, wherein the nanocontainer is loaded with an anti-corrosion inhibitor, which is released in response to changes in pH (para [0018], claim 3). The disclosure further identifies that silica particles can be used for the nanocontainer base/substrate, wherein a polyelectrolyte shell is built thereon, by alternating positively and negatively charged electrolytes (para [0021]), and an anti-corrosive substance, such as benzotriazole, is loaded within the alternating polyelectrolyte layers (para [0021]).

Sjong further discloses that the electrolytes to be coated on the silica particles (to make up the polyelectrolyte layered shell) can include sodium polystyrene sulfonate, polydiallyl dimethyl ammonium chloride, polyallylamine hydrochloride and the like (para [0021]). The nanocontainers, once synthesized, are incorporated in polymeric coatings (para [0028]).

US 2011/0236596 describes a corrosion inhibiting coating which includes a primer layer having incorporated therein corrosion inhibitor-loaded containers which release a corrosion inhibitor in response to electromagnetic irradiation; and a container-free protective top layer which, when intact, prevents spontaneous opening of the containers in the primer layer induced by electromagnetic irradiation, wherein the coating-releases an inhibitor in response to electromagnetic irradiation if the protective top layer contains defective areas which enable direct exposure of the containers to the electromagnetic irradiation.

CN103483897 A relates to a preparation method of a self-repair coating based on a corrosion inhibitor intercalated nano-titanate carrier. The preparation method comprises the following steps: preparation of layered nano-titanate, preparation of the corrosion inhibitor intercalated nano-carrier and preparation of the self-repair coating, wherein the preparation of the layered nano-titanate comprises the step of grinding $K_2CO_3$ and $TiO_2$ solids according to a certain molar ratio; the preparation of the corrosion inhibitor intercalated nano-carrier comprises the steps of taking organic amines, imidazoles, allyl thiourea and other nitrogen-containing organic matters as objects, taking the layered nano-titanate as a subject, and preparing the corrosion inhibitor intercalated nano-carrier through intercalation reaction in an ethanol solvent under microwave conditions; the preparation of the self-repair coating comprises the step of finally mixing prepared functional particles with sol-gel to prepare a functional sol-gel film to coat on the surface of a metal to be protected.

EP 1 832 629 A1 describes a corrosion inhibiting pigment comprising nanoscale reservoirs (nanoreservoirs) of corrosion inhibitor for active corrosion protection of metallic products and structures, wherein the nanoreservoirs comprise a polymer or polyelectrolyte shell which is sensitive to a specific trigger and capable to release said inhibitor after action of said trigger. Also described are an anti-corrosive coating with self-healing properties comprising said pigment, methods for preparing said pigment, in particular by layer-by-layer deposition, as well as methods of use of said pigment.

US 2013/0145957 A1 relates to reservoirs of encapsulated corrosion inhibitors and/or biocides for active corrosion and/or antifouling protection of metallic and polymeric products and structures, wherein the reservoirs have average dimensions of 10-50000 nm and comprise a porous surface/interface, a porous or empty interior and stimuli-sensitive stoppers that release an encapsulated inhibitor or biocide outside the reservoir upon action of a stimulus selected from the group consisting of an external electromagnetic field, changes in local pH, ionic strength and ambient temperature, wherein the stimuli-sensitive stoppers result from a chemical or physical interaction between encapsulated corrosion inhibitor and/or biocide or encapsulated solvent/dispersing agent and an additional external compound and prevent release of an encapsulated inhibitor or biocide towards an exterior of the reservoir in the absence of the stimulus.

Indian Patent Application IN 2012MU01539 A studies the ultrasound assisted synthesis of nano container by LbL method and its application in anticorrosive coatings. Synthesis of nano container particles, preparation of nanocontainer polyamide composite by in-situ method, preparation of epoxy-polyamide coatings, application of coating on mild steel substrate, evaluation of the coated film for corrosion inhibition properties are described as well.

WO 2013/083293 A1 relates to a method of manufacturing a coated steel substrate which comprises the steps of: (i) providing a steel substrate; (ii) preparing a first coating mixture comprising nanocontainers with nanoscale corrosion inhibitors contained therein; (iii) preparing a second coating mixture comprising a curable organic component; (iv) combining the first coating mixture and the second coating mixture; (v) applying the combined mixture on the steel substrate; (vi) curing the combined mixture so as to produce a dense network structure of the coating for barrier and active corrosion protection of the steel substrate.

US 2003/0219384 A1 relates to capsules coated with a polyelectrolyte shell and methods for the production thereof.

GR20110100152 A describes multifunctional coatings consisting of epoxy and organo-modified silicates including nanocontainers which were synthesized for corrosion protection of metal alloys. The nanocontainers were loaded with corrosion inhibitors. The release of inhibitors from the nanocontainers is achieved through specific trigger. Methods of synthesis of nanocontainers and coatings are included as well as application methods of the coatings to the metal alloys.

WO 99/47253 A1 refers to a process for preparing coated particles and hollow shells by coating colloidal particles with alternating layers of oppositely charged nanoparticles and polyelectrolytes and optionally removing the colloidal cores.

CN 102784598 A comprises a description of LBL addition of polyelectrolytes and corrosion inhibitor on the silica hydrosol in order to obtain self-repairing nanometer-scale composite sol for long-acting corrosion prevention of metal plate.

L. Mingzhu, W. Tao, Z. Xiaoxue, F. Xiaoli, T. Jing, X. Qiaoqiao, X. Hairong, G. Hu, H. Jianping, Corrosion Science (2014), 87, 297-305, describe a synthesis of compacted, molybdenum-embedded, ordered, mesoporous, protective carbon films of graphitic structure.

Wang, Tao; Zhang, Chuan Xiang; Sun, Xin; Guo, Yunxia; Guo, Hu; Tang, Jing; Xue, Hairong; Liu, Mingzhu; Zhang, Xiaoxue; Zhu, Lei, Journal of Power Sources (2012), 212, 1-12, describe a synthesis of ordered mesoporous boron-containing carbon films and their corrosion behavior in simulated proton exchange membrane fuel cells environment.

SUMMARY OF THE INVENTION

It is an object of the present invention to provide improved containers for containing corrosion inhibitors. Such containers shall be especially advantageous in terms of on-demand release of the corrosion inhibitor from the container, cost efficiency, self-healing properties of coatings containing such containers, uniform thickness of coatings containing such containers, and low curing temperatures for coatings containing such containers in order to improve the energy efficiency during coating.

It is a further object of the present invention to provide coatings comprising such improved containers which contain corrosion inhibitors.

It is also an object of the present invention to provide methods for producing such improved containers which contain corrosion inhibitors.

In order to achieve one or more of the mentioned objects, the present invention provides a mesoporous carbon container comprising an embedded organic corrosion inhibitor and having an organic polymeric coating. Preferably, the corrosion inhibitor is an azole derivative, especially benzotriazole, while the organic polymeric coating is preferably made from a polyelectrolyte, especially from poly (allyl amine) hydrochloride. Accordingly, in a particularly preferred embodiment the corrosion inhibitor is benzotriazole and the organic polymeric coating is made from poly (allyl amine) hydrochloride.

The present invention also provides a coating composition comprising a primer and a mesoporous carbon container as described above and herein. The primer is preferably selected from vinyl acrylate and polyvinyl butyral, and is especially vinyl acrylate. In order to achieve certain advantages of this invention, such a composition, preferably one with vinyl acrylate or polyvinyl butyral and especially with vinyl acrylate as a primer the coating composition is coated on a steel surface. Such a coating composition is more preferably a coating composition which is self-healing, which in the sense of this application means that cracks which are formed in the composition "heal", i.e. cracks formed therein disappear over time at least partly.

The present invention further provides a method for producing a mesoporous carbon container comprising an embedded organic corrosion inhibitor and having an organic polymeric coating, the method comprising the following steps in the given order:

dispersing the mesoporous carbon in water by sonication to give a mixture of mesoporous carbon and water, degassing mesoporous carbon under vacuum, adding an organic corrosion inhibitor to the mixture of mesoporous carbon and water to give a mixture of mesoporous carbon, water and organic corrosion inhibitor, degassing the mixture of mesoporous carbon, water and organic corrosion inhibitor under vacuum, removing excess of corrosion inhibitor by centrifugation and washing with water, drying, adding an organic polymeric coating material in order to form the organic polymeric coating, wherein the corrosion inhibitor is preferably benzotriazole and wherein the organic polymeric coating is preferably made from poly (allyl amine) hydrochloride.

DEFINITIONS

Mesoporous in the sense of this application means microporous as defined by IUPAC, see e.g. Rouquerol, J.; Avnir, D.; Fairbridge, C. W.; Everett, D. H.; Haynes, J. M.; Pernicone, N.; Ramsay, J. D. F.; Sing, K. S. W.; Unger, K. K. (1994). "Recommendations for the characterization of porous solids (Technical Report)". Pure and Applied Chemistry. 66 (8). doi:10.1351/pac199466081739, so that the mesoporous carbon according to the present invention contains pores with diameters between 2 and 50 nm.

A carbon container in the sense of this application means a container or reservoir as understood in the technical field of the present invention, i.e. a container or reservoir which contains or encapsulates a compound which may act as an organic corrosion inhibitor upon release. The organic corrosion inhibitor is thus to be embedded or included or encompassed by the mesoporous carbon. A corrosion inhibitor is understood to be a chemical compound that, typically when added to a liquid or gas, decreases the corrosion rate of a material, especially a metal or an alloy, see for example Hubert Gräfen, Elmar-Manfred Horn, Hartmut Schlecker, Helmut Schindler "Corrosion" Ullmann's Encyclopedia of Industrial Chemistry, Wiley-VCH: Weinheim, 2002. doi: 10.1002/14356007.b01_08.

An organic polymeric coating in the sense of this application is a coating made from a polymer which itself is formed from one or more organic monomers as generally understood in chemistry. All sorts of organic polymers are contemplated for use in the present invention and thus considered for the organic polymeric coating of the present invention. The organic polymeric coating is present on the outer surface of the mesoporous carbon container in which the organic corrosion inhibitor is embedded, thereby encapsulating both, the mesoporous carbon container and the organic corrosion inhibitor. Moreover the organic polymeric coating could prevent the unwanted release of corrosion inhibitor from the nanocontainer.

BRIEF DESCRIPTION OF THE DRAWINGS

The present invention will be described with reference to the accompanying drawings of which.

DETAILED DESCRIPTION OF THE INVENTION

The identified advantages of the self-healing anti-corrosion coating compositions, as per the inventor's provided disclosure are as follows:

Nanocontainers in the polymer coatings have more freedom of movement than those in the sol-gel coatings where they are tightly bound with the sol-gel.

Since the cost of the raw materials (metal alkoxides) used the sol-gel coatings are high, this method is economically not feasible. Starting materials used for the nanocontainer-polymer coatings such as vinyl acrylate and polyvinyl butyral (PVB) are most cost effective.

Curing of nanocontainer-polymer coatings at 30-70° C. is enough to get a uniform thick coating. Sol-gel coatings always require high temperature annealing to achieve a dense microstructure.

Sintering at high temperatures introduces cracks and/or delamination of sol-gel coatings. Curing of nanocontainer-polymer coatings improve the chemical and physical interaction between the functional groups such as amine, hydroxyl etc. on the outer layer polyelectrolyte shell with the polymeric matrix, which enhances the nanocontainer compatibility and reduces the chances of coating damages.

Successful commercially available sol-gel coatings are thin films. Thick films of (>1 µm) sol-gel coatings always have cracking problems. Uniform coatings with thickness greater than 1 µm could easily be obtained from nanocontainer-polymer formulation according to the invention.

In the present invention so-called nanocontainers are described which are made from mesoporous carbon (Meso C). The use of mesoporous carbon as carrier of corrosion inhibitor is not well reported in the literature. Therefore, the present work has been conducted in the fabrication of corrosion inhibitor encapsulated mesoporous carbon based nanocontainer coatings for the corrosion protection of metal structures. Corrosion inhibitor was added directly into the pores of carbon matrix and then covered by polyelectrolyte layers to prevent the unwanted release. It was applied for coating preparation by mixing with vinyl acrylate primer. The advantage of mesoporous carbon nanocontainer over silica nanocontainer is that the coatings would be more hydrophobic and it can protect the UV radiation as well.

Synthesis of Mesoporous Carbon/(BT)3/PAH Nanocontainer

Mesoporous carbon (0.5 g) was dispersed in 15 ml of water by sonication. It was then degassed under vacuum to open up the pores. Benzotriazole (BT) (20 mg/ml) dissolved in water was added to this mixture with constant stirring and then again degassed under vacuum. The vacuum was adjusted at the point when the bubbling of air from the pores starts. This degassing process was continued till the bubbles from the mixture is completely disappeared. The excess of benzotriazole was removed by centrifugation and washing with water and then dried at 80° C. for 24 h. These steps were repeated three times to completely fill the pores of mesoporous carbon with benzotriazole. 10 mg/ml of poly (allyl amine) hydrochloride (PAH) was added as the covering layer for the benzotriazole encapsulated mesoporous carbon and a final structure of Meso Carbon/(BT)3/PAH was obtained.

Mesoporous Carbon Nanocontainer Coatings on Carbon Steel

The final mixtures of Meso Carbon/(BT)3/PAH nanocontainers were dried in oven at 80° C. for overnight. 0.5 g of mesoporous carbon nanocontainer was added slowly to a 30 g of solvent based vinyl acrylate with magnetic stirring and then was coated on the carbon steel substrate by dip coating. After drying at 80° C. for 2 h followed by 60° C. for 12 h all the sides were sealed with quick setting epoxy. A schematic representation of silica nanocontainer synthesis and coating on carbon steel substrate is given in FIG. 12. Corrosion analysis of each coating was conducted by immersion test in 0.35M sodium chloride solution. In order to study the self-healing nature of the coatings a scratch was made before immersing in sodium chloride solution. Corrosion was monitored at periodic intervals using microscopic techniques and measured quantitatively by electrochemical techniques. Release of benzotriazole from the nanocontainers was monitored by UV-Visible-NIR spectrometer at different pH solutions.

Results and Discussion

Figure 1:
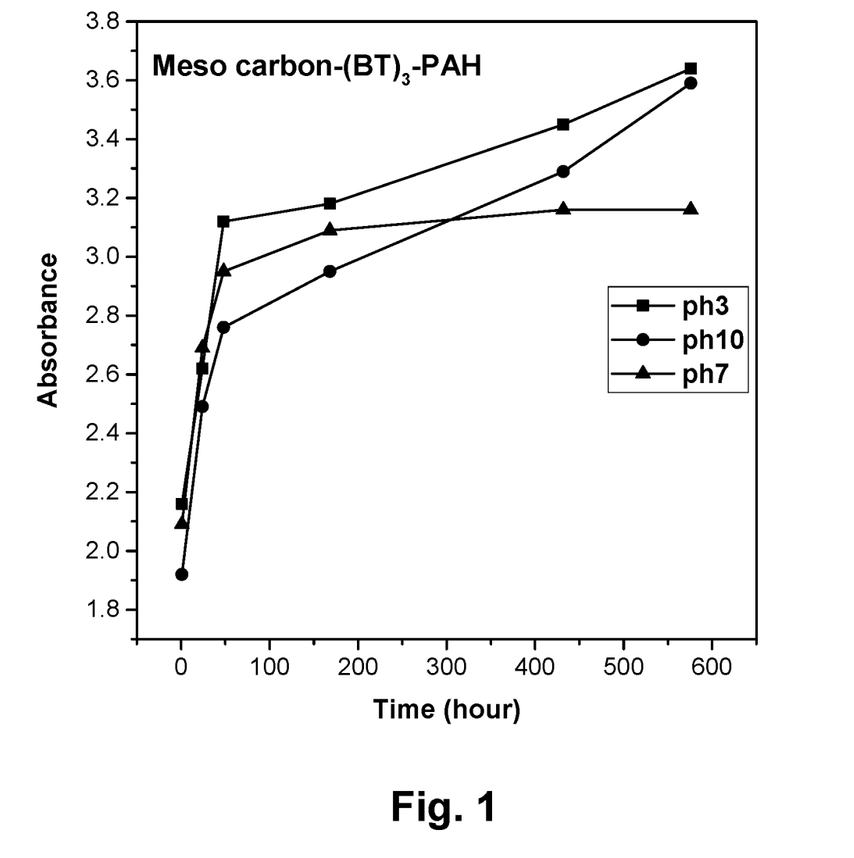
FIG. 1 shows characteristics of a release of benzotriazole from meso carbon/(BT)3/PAH (nano)container in different pH solutions.

FIG. 1 shows the release of benzotriazole from Meso carbon/(BT)3/PAH nanocontainer at different pH solutions measured by UV-Visible-NIR spectrometer. In the UV spectra, nanocontainers at pH 3 and 10 solutions showed a higher absorbance than those in pH 7 solution, indicating the more release of benzotriazole in acidic and alkaline media. It was due to its solubility that benzotriazole dissolves in acidic and alkaline solutions far better than neutral media. Additionally, UV spectra confirmed further the presence of benzotriazole inside the pores of carbon nanocontainer.

Figure 2:
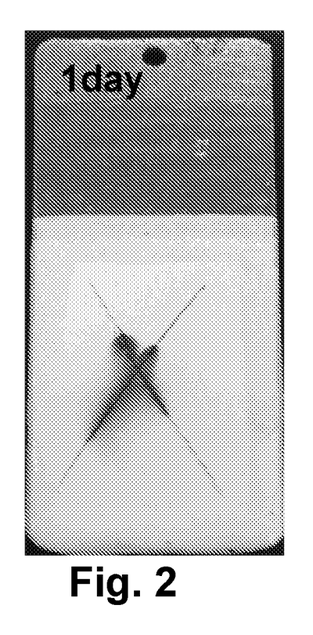
FIG. 2 shows the digital image of scratched surface of vinyl acrylate alone coated substrate after 1 day of immersion in 0.35M sodium chloride solution.
Figure 3:
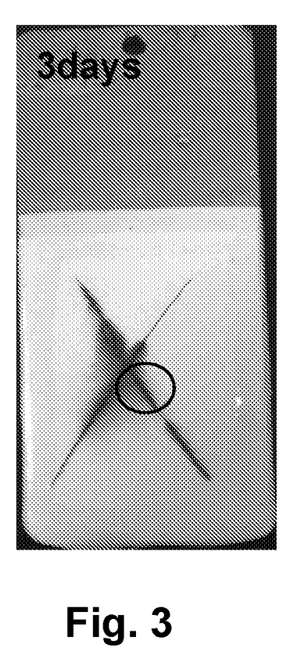
FIG. 3 shows the digital image of scratched surface of vinyl acrylate alone coated substrate after 3 days of immersion in 0.35M sodium chloride solution.
Figure 4:
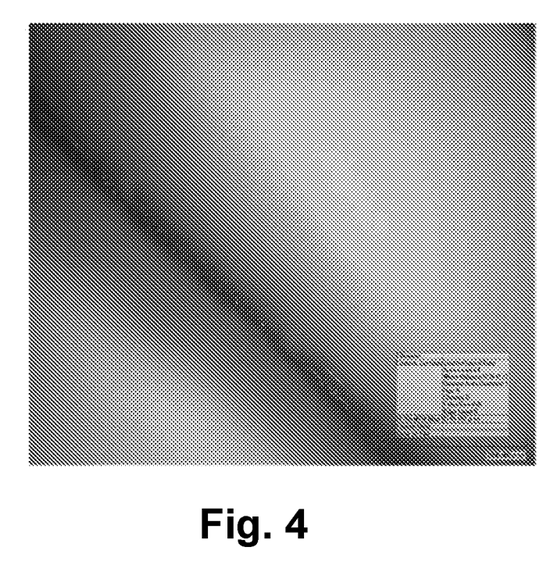
FIG. 4 shows the optical image of the corroded area of the scratch on vinyl acrylate alone coated substrate marked with circle in FIG. 3.
Figure 5:
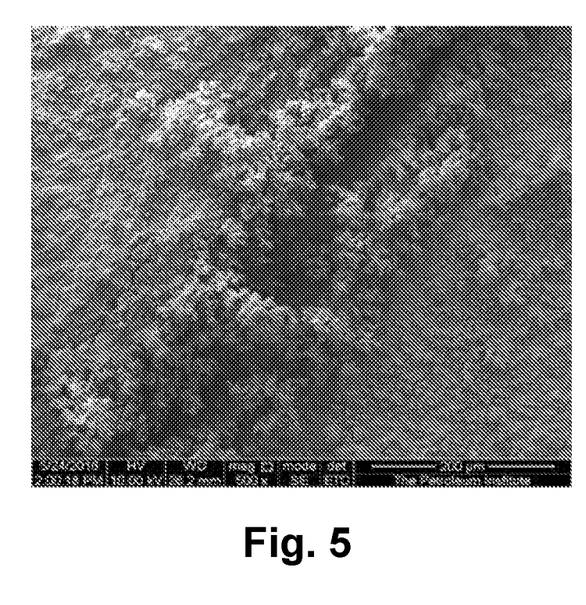
FIG. 5 shows the SEM image of corroded area of the scratch on vinyl acrylate alone coated substrate marked with circle in FIG. 3.
Figure 6:
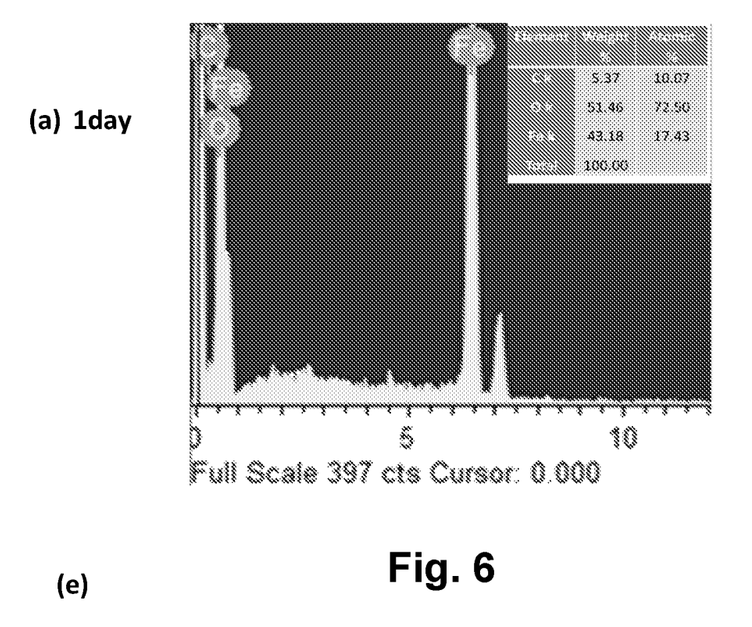
FIG. 6 shows the EDAX of corroded area of the scratch on vinyl acrylate alone coated substrate marked with circle in FIG. 3.

In order to analyze the self-healing nature the scratched coatings of both vinyl acrylate and nanocontainer embedded vinyl acrylate were immersed in 0.35M sodium chloride solution. Sevier corrosion products on the scratches of vinyl acrylate alone coated substrate was clearly visible in FIGS. 2 & 3. Optical and SEM images also showed the corrosion products on the scratches and EDAX results confirmed the formation of iron oxides as well (FIGS. 4, 5 & 6). Corrosion progressed with time and slowly it covered all the scratches.

Figure 7:
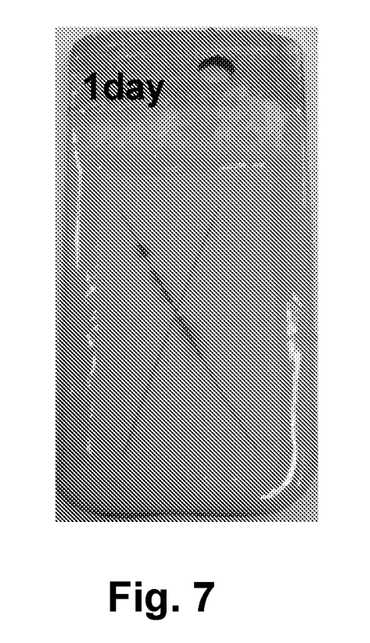
FIG. 7 shows the digital image of scratched surface of mesoporous carbon/(BT)3/PAH (nano)container coating after 1 day of immersion in 0.35M sodium chloride solution.
Figure 8:
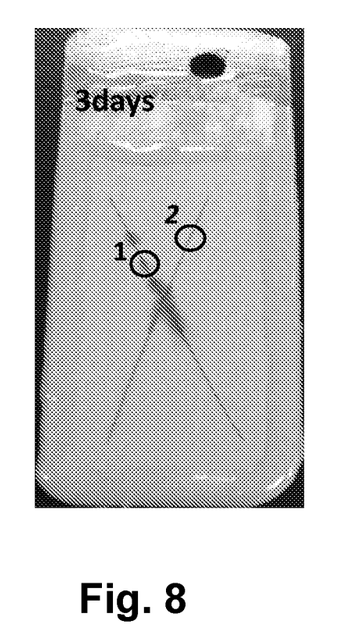
FIG. 8 shows the digital image of scratched surface of mesoporous carbon/(BT)3/PAH (nano)container coating after 3 days of immersion in 0.35M sodium chloride solution.
Figure 9:
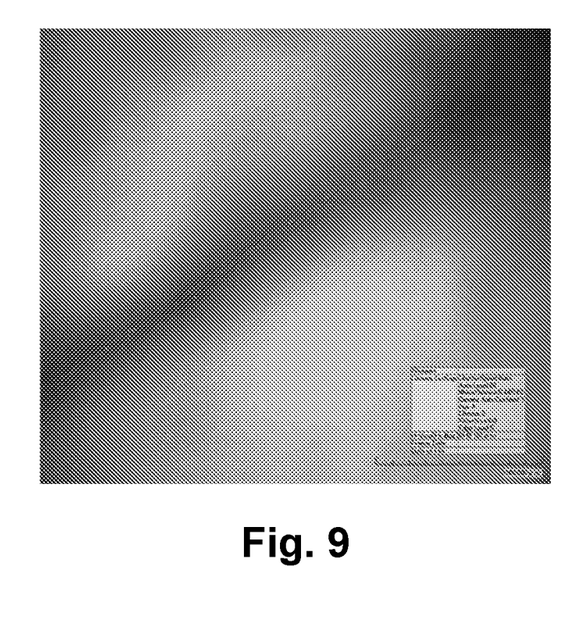
FIG. 9 shows the optical image of the corroded area of the scratche on mesoporous carbon/(BT)3/PAH (nano)container coating marked with circle 1 in FIG. 8.
Figure 10:
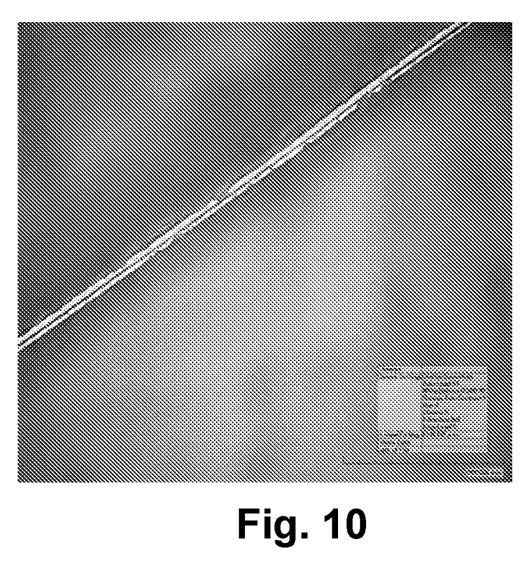
FIG. 10 shows the optical image of the non-corroded area of the scratche on mesoporous carbon/(BT)3/PAH (nano)container coating marked with circle 2 in FIG. 8.
Figure 11:
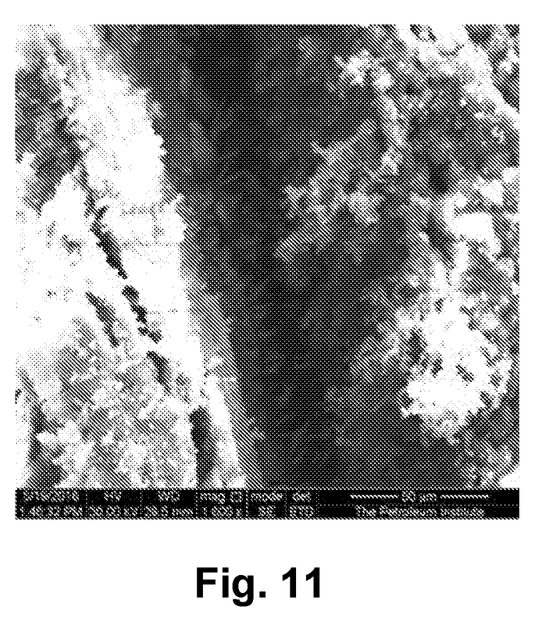
FIG. 11 shows the SEM image of the corroded area of the scratch on mesoporous carbon/(BT)3/PAH (nano)container coating marked with circle 1 in FIG. 8.
Figure 12:
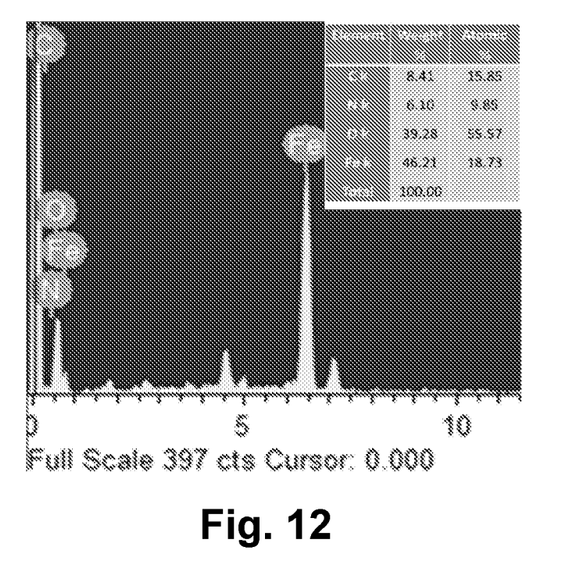
FIG. 12 shows the EDAX of the corroded area of the scratch on mesoporous carbon/(BT)3/PAH (nano)container coating marked with circle 1 in FIG. 8.
Figure 13:
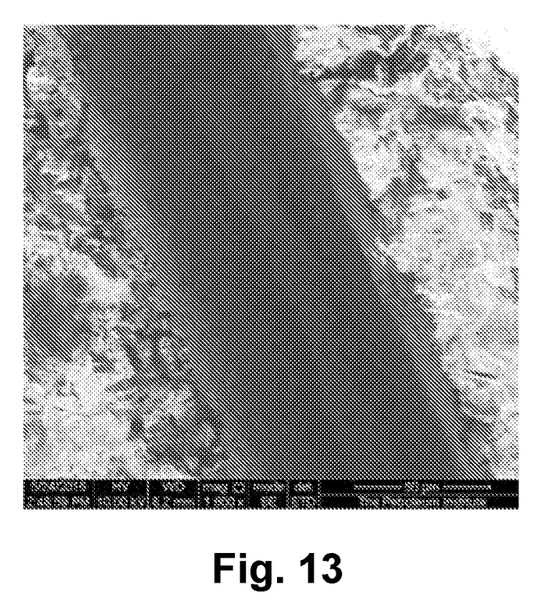
FIG. 13 shows the SEM image of the non-corroded area of the scratch on mesoporous carbon/(BT)3/PAH (nano) container coating marked with circle 2 in FIG. 8.
Figure 14:
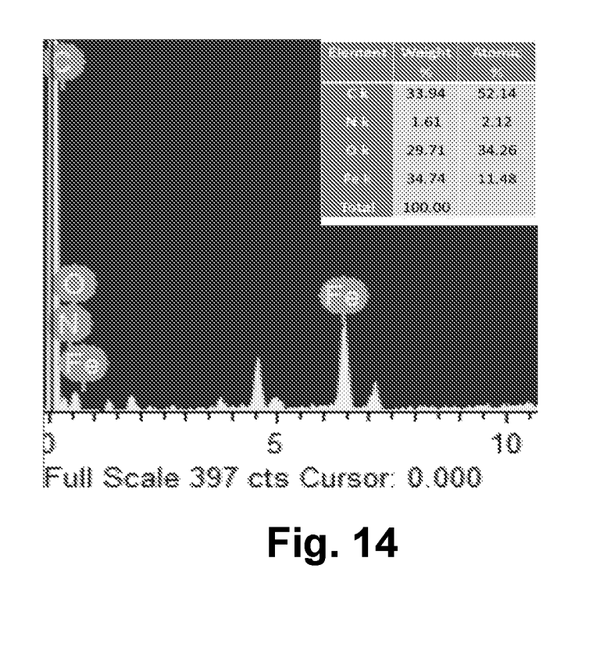
FIG. 14 shows the EDAX of the non-corroded area of the scratch on mesoporous carbon/(BT)3/PAH (nano)container coating marked with circle 2 in FIG. 8.

Immersion test conducted on the Meso carbon/(BT)3/PAH nanocontainer embedded coatings are given in FIGS. 7 & 8. Compared with vinyl acrylate alone coated substrate nanocontainer coatings showed less corrosion products on the scratches (FIGS. 7 & 8). Optical and SEM images of the corroded area, marked with circle 1 in FIG. 8, was observed to be covered by a precipitate and the EDAX showed the presence of nitrogen in that area (FIGS. 9, 11 & 12). It indicated that benzotriazole released from the nanocontainer diminished the extent of corrosion that was apparent from the less intensity of corrosion products on the scratches of nanocontainer coating compared with vinyl acrylate coating (FIGS. 3 & 8). The optical and SEM images of the non-corroded areas of the scratches given in FIG. 10 and FIG. 13 respectively showed clean surfaces. EDAX of this area also showed the presence of nitrogen and oxygen atoms along with iron (FIG. 14). It indicated that benzotriazole released from the nanocontainer formed resistive layers with iron and oxygen on the metal surface which prevented corrosion. It can be suggested therefore that mesoporous carbon nanocontainers were effective carriers of benzotriazole which got released on demand at required areas of metal structures for corrosion protection.

Figure 15:
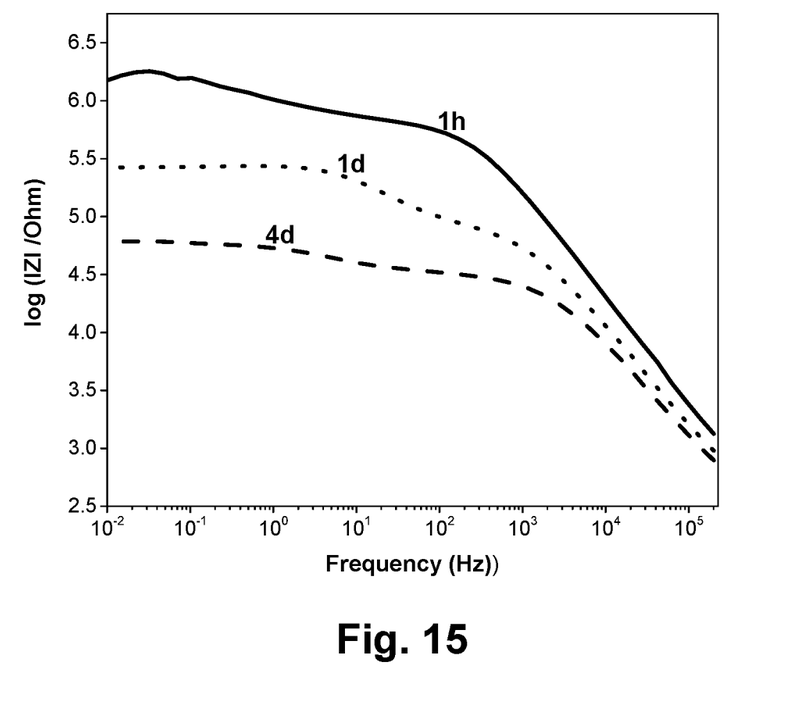
FIG. 15 shows Bode plot of vinyl acrylate coating at different time of immersion in 0.35M sodium chloride solution.
Figure 16:
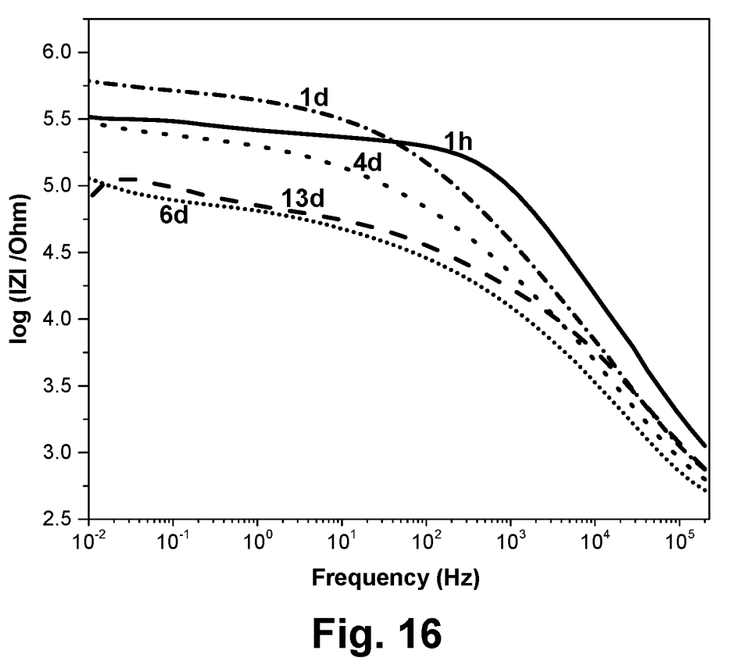
FIG. 16 shows Bode plot of mesoporous carbon/(BT)3/PAH (nano)container embedded coating at different time of immersion in 0.35M sodium chloride solution.

Self-healing performance of the nanocontainer embedded coatings were quantified by measuring impedance and open circuit potential (OCP) at different time of immersion in 0.35M sodium chloride solution. Electrochemical impedance (EIS) of vinyl acrylate coating and nanocontainer coating, measured using a three electrode set up, are given in FIGS. 15 & 16 respectively. Low frequency impedance (log Z) of nanocontainer coatings at initial time of immersion was at 5.5 Ωcm² which is slightly lower than the vinyl acrylate coating (6.2 Ωcm²). Low frequency impedance of vinyl acrylate coating decreased continuously and reached 4.6 Ωcm² by 4 d whereas for nanocontainer coating low frequency impedance reached a similar value by 13 d. This behavior of nanocontainer coating was due to the corrosion inhibitive nature of benzotriazole released from the Meso carbon/(BT)3/PAH nanocontainer.

Figure 17:
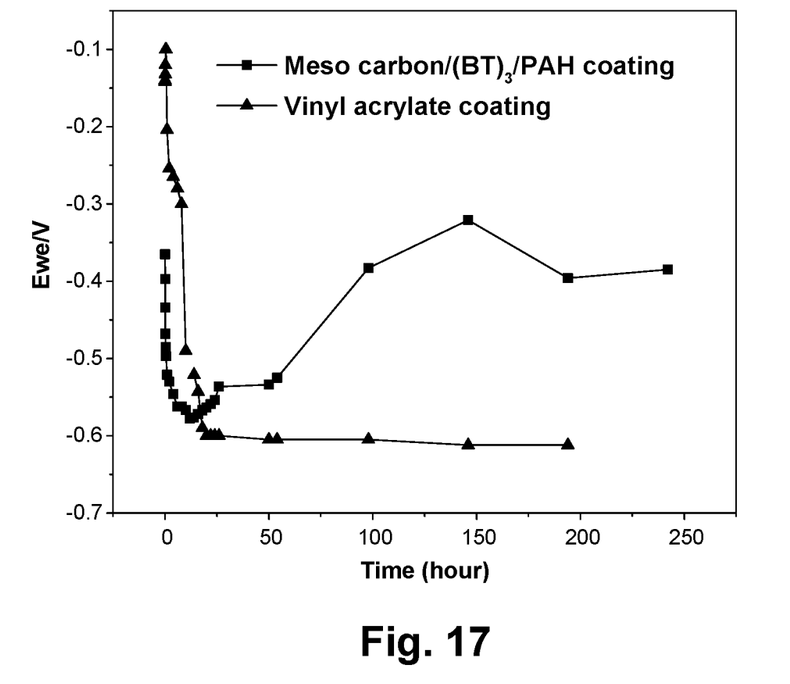
FIG. 17 shows OCP plots of mesoporous carbon/(BT)3/PAH (nano)container embedded coatings and vinyl acrylate alone coated substrate at different time of immersion in 0.35M sodium chloride solution.
Figure 18:
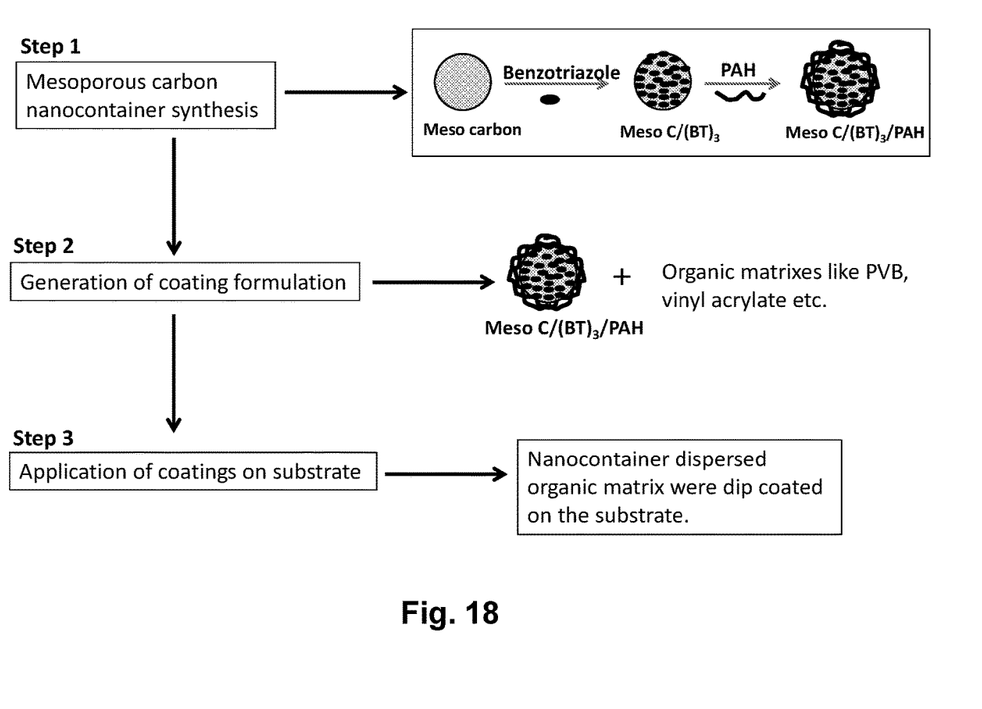
FIG. 18 is a schematic representation of mesoporous carbon/(BT)3/PAH (nano)container synthesis and of an application on a carbon steel substrate according to the invention.

Open circuit potential (OCP) related to the corrosion potential, measured when no current or potential being applied to the cell, showed a decreasing trend to nanocontainer coating during the initial days of exposure and then started to increase after 50 hours (FIG. 17). This type of OCP behavior clearly shows the self-healing nature of the coating. At the same time OCP of vinyl acrylate alone coated substrates didn't increase after the initial decrease and it continued to remain at the lower value during the further immersion in sodium chloride solution. Both immersion test and electrochemical analysis concluded that mesoporous carbon nanocontainers are effective in providing protection by inhibiting corrosion on the metal surface by the release of encapsulated corrosion inhibitor.

The invention claimed is:

1. A method for producing a mesoporous carbon nanocontainer comprising an embedded organic corrosion inhibitor and having an organic polymeric coating, wherein the corrosion inhibitor is benzotriazole and wherein the organic polymeric coating is made from poly (allyl amine) hydrochloride, wherein the mesoporous carbon nanocontainer contains pores with diameters between 2 nm and 50 nm, the method comprising the following steps in the given order:

dispersing the mesoporous carbon in water by sonication to give a mixture of mesoporous carbon and water, degassing the dispersion of mesoporous carbon under vacuum, dissolving the organic corrosion inhibitor in water, adding the dissolved organic corrosion inhibitor to the mixture of mesoporous carbon and water to give a mixture of mesoporous carbon, water and organic corrosion inhibitor, degassing the mixture of mesoporous carbon, water and organic corrosion inhibitor under vacuum, removing excess of corrosion inhibitor by centrifugation and washing with water, drying, adding an organic polymeric coating material in order to form the organic polymeric coating.

* * * * *